US006411329B1

(12) United States Patent
Richard et al.

(10) Patent No.: US 6,411,329 B1
(45) Date of Patent: Jun. 25, 2002

(54) SYSTEM, IN PARTICULAR FOR TIMING RACES; INCLUDING A PHOTOSENSITIVE SENSOR AND METHOD FOR ADJUSTING THE ALIGNMENT OF SUCH A SYSTEM WITH A LINE ACROSS WHICH OBJECTS OR PERSONS PASS

(75) Inventors: Pascal Richard, Marin; Jean-Claude Rais, Delémont; François Arthofer, Bienne, all of (CH)

(73) Assignee: Omega Electronics S.A., Bienne (CH)

( * ) Notice: Subject to any disclaimer, the term of this patent is extended or adjusted under 35 U.S.C. 154(b) by 0 days.

(21) Appl. No.: 09/138,075

(22) Filed: Aug. 21, 1998

(30) Foreign Application Priority Data

Aug. 22, 1997 (EP) ........................................ 97114547

(51) Int. Cl.[7] .............................................. H04N 7/18
(52) U.S. Cl. .................................................. 348/157
(58) Field of Search ...................... 348/157; 346/107.2; 352/39; 368/3; 345/9

(56) References Cited

U.S. PATENT DOCUMENTS

| | | | | | |
|---|---|---|---|---|---|
| 3,678,189 | A | * | 7/1972 | Oswald | 348/157 |
| 4,523,204 | A | * | 6/1985 | Bovay | 396/315 |
| 4,743,971 | A | * | 5/1988 | Hugli | 348/157 |
| 4,797,751 | A | * | 1/1989 | Yamaguchi | 386/117 |
| 5,105,395 | A | * | 4/1992 | Imhof | 368/9 |
| 5,136,283 | A | * | 8/1992 | Nobs | 345/196 |
| 5,493,331 | A | | 2/1996 | Takahashi et al. | 348/157 |

FOREIGN PATENT DOCUMENTS

| | | | |
|---|---|---|---|
| DE | 39 37 977 | 12/1990 | G07C/1/24 |
| DE | 92 02 456.4 | 6/1992 | G07C/1/24 |
| EP | 223119 | 5/1987 | G07C/1/22 |
| EP | 384334 | 8/1990 | G07C/1/24 |
| EP | 402749 | 12/1990 | G07C/1/24 |

* cited by examiner

*Primary Examiner*—Vu Le
(74) *Attorney, Agent, or Firm*—Sughrue Mion, PLLC

(57) ABSTRACT

A system, installed in the extension of a line across which an object or a person passes, includes: an optical device for projecting an image of this line onto a photosensitive sensor capable of providing an image signal; at least a processor for processing the image signal; and a screen, connected to the processor, for displaying an image representative of the image signal, called the video image, connected to said processor, wherein the sensor is formed of a pixel matrix. A reticule signal is generated and superposed onto the video image displayed on the screen, the system also being capable of generating electric signals originating from a pixel column which corresponds to the position of the reticule on the screen.

21 Claims, 2 Drawing Sheets

SYSTEM, IN PARTICULAR FOR TIMING RACES; INCLUDING A PHOTOSENSITIVE SENSOR AND METHOD FOR ADJUSTING THE ALIGNMENT OF SUCH A SYSTEM WITH A LINE ACROSS WHICH OBJECTS OR PERSONS PASS

BACKGROUND OF THE INVENTION

The present invention concerns a system, in particular for timing races, and more particularly such a system including an optical device installed in a fixed station in the extension of a line across which objects or persons pass for projecting an image of such line onto a photosensitive sensor. The invention also concerns a method for adjusting the alignment of such a system with a line across which objects or persons pass such as a finish line of a race.

European Patent Document No. EP-A-0 207 675 discloses a system for determining the times separating the passing of competitors across a line of a race or a reference line substantially perpendicular to their trajectory. This system includes a camera, an image storage and processing device, a control box and a monitoring screen. The camera includes an optical unit with which is associated a photosensitive sensor on which the image of the reference line is intended to be projected. The optical unit comprises a conventional optical lens and the photosensitive sensor is formed of a bar, comprising a plurality of juxtaposed pixels in a single column, generally designated a CCD (Charged Coupled Device) bar.

In order to operate satisfactorily, the camera has to be installed in a fixed station in the extension of the reference line and perpendicular thereto. More particularly, the reference line must be in perfect alignment with the CCD bar of the camera.

Such alignment is generally achieved in two steps.

According to a first step implemented at the factory, the CCD bar is aligned once and for all with the camera optical device on an optical bench. During this operation, the CCD bar is moved with respect to the optical unit in order to bring it into superposition with a line of sight of an eyepiece mounted on the camera optical unit via different screw adjustment mechanisms. Once this adjustment is performed, the CCD bar is secured in this position via mechanical means such as screws.

According to a second step, the CCD bar is aligned with the reference line via the eyepiece upon each installation of the camera on site. For this purpose, the optical unit further includes a mirror swinging between a first position called the operating position, in which the plane of the mirror is clear of the optical path connecting the CCD bar to the lens and a second position, called the adjusting position, in which the mirror is placed on said optical path and reflects the image perceived by the lens, in this case the image of the reference line, onto the eyepiece. In order to perform the alignment of the CCD bar with the reference line, it is thus necessary to place the mirror in the adjusting position, then to move the camera, which has previously been fixed to a conventional adjustment tripod, while watching the image of the reference line in the eyepiece until such image is superposed with said line of sight of the eyepiece. Once this latter adjustment has been performed, the tripod is fixed in this position via conventional mechanical means and the shooting can begin.

This system has different drawbacks due, in particular, to the fact that it requires the use of adjustment mechanisms including numerous parts which are complicated to machine which makes manufacturing laborious and significantly increases the cost price of the camera. The limited reliability of the system, due to the numerous mechanical parts of which it is formed, should also be mentioned in this regard.

Moreover, the adjustments required by the camera during the assembly thereof at the factory are long and intricate. Further, in the event of shocks or vibrations, the mechanical parts of the eyepiece adjustment device can become bent and bring the reticule of the eypiece out of alignment with respect to the CCD bar.

SUMMARY OF THE INVENTION

A main object of the invention is thus to overcome the drawbacks of the aforementioned prior art by providing a system including a camera which includes a simple inexpensive device allowing accurate adjustment of the alignment of a photosensitive sensor of the CCD bar type with a line across which objects or persons pass such as a finish line of a race.

The invention therefore concerns a system able to be installed in the extension of a line across which at least one object or person passes (hereinafter “crossing line”), such as a finish line of a race, said system including:

an optical device for projecting an image of this line onto a photosensitive sensor capable of providing electric signals representative of the image projected by the optical device and captured by said sensor, called the image signal, means for processing said image signal, display means provided for displaying on a screen an image representative of said image signal, called the video image, connected to said processing means. This system is characterised in that said sensor is formed of a pixel matrix, in that it is provided with means for generating a signal forming a reticule which is displayed on said screen and which is superposed onto the video image, and in that it further includes means for extracting, from said image signal which they receive as input, electric signals originating from a column of pixels of the matrix which corresponds to the position of the reticule on the screen and for providing a column signal as output.

As a result of these features, the complicated operation and mechanical structure of the optical unit of the systems of the prior art are replaced by a single sensor, which allows both the accuracy of alignment of the system and the reliability thereof to be increased while reducing the cost price thereof.

According to an advantageous feature of the invention, the reticule is associated with control means via a comparator circuit which receives as input the image signal and a reference signal originating from the control means and provides as output a control signal, and the reticule can be moved across the image in response to the control signal.

Thus, one can for example select, by means of an electronic cursor, the CCD column which corresponds to the reference line which one can see on a monitoring screen.

According to a preferred embodiment of the invention, the system further includes means for switching the image signal either to the processing means, or to the extraction means, thereby switching the system into respectively a spatial or temporal operating mode.

These switching means have, in particular, the advantage of allowing the positioning of the system to be checked easily at any time simply by switching the system from the temporal mode to the spatial mode. In other words, the system can be passed from the mode in which it uses only one single pixel column to acquire the data representing the image given at each moment of the crossing line, and for example to process such data in conformity with the description given in European Patent No. EP 0 402 749, which is incorporated herein by reference, to the mode in which the sensor is used conventionally as a video image sensor with a sweep frequency which depends only on the standard used, for example PAL, NTSC or suchlike.

The invention also concerns a method for adjusting the alignment of a system with a line across which objects or person pass, the system including an optical device having an optical axis, the device being capable of projecting an image of this line onto a photosensitive sensor formed of a matrix of pixels capable of providing electric signals representative of the projected image received by said sensor, called the image signal, means for processing said image signal, display means provided for displaying an image representative of said image signal, called the video image, on a screen, said display means being connected to the processing means, characterised in that it includes the steps consisting in:

(a) placing the system in the extension of said crossing line so that the axis of its optical device is substantially directed onto said line, (b) reading at a first determined frequency the electric signal provided by the pixels situated in several columns of the matrix forming the sensor to generate on the screen said video image including in particular the image of said crossing line;

(c) generating a signal forming a reticule which is displayed on said screen and which is superposed onto a portion of the video image;

(d) superposing the reticule onto said image of said crossing line in the video image; and (e) selecting the pixel column of the sensor which corresponds to the reticule.

It will be noted that according to the method of the invention, the alignment of the system can be performed by moving, for example via an electronic control, a reticule onto a video image in order to superpose the reticule onto the image of the crossing line appearing on the screen. Thus, adjustment of the alignment is simplified in particular in that the use of mechano-optical mechanisms is completely omitted.

According to an advantageous implementation of the invention, the method described hereinbefore can be completed by the steps of:

(f) reading at a second determined frequency, the electric signal provided by the selected pixel column, called the column signal, which corresponds to the image intensity profile of said line at a given moment; and (g) providing said column signal to exploitation means.

Thus, once the alignment steps have been performed, the alignment method of the invention can be completed in simple manner to offer other possibilities for exploiting the method such as timing races.

Other features and advantages of the invention will appear more clearly upon reading the following description of an embodiment of the invention given purely by way of illustrative and non limiting example, this description being given in conjunction with the annexed figures, in which:

The description of the system according to the invention will be made within the scope of an application to the timing of a race and more precisely to the adjustment of the alignement of a CCD type photosensitive sensor with a crossing line of a race with a view to effecting timing with photographic shots of runners who cross the line.

DETAILED DESCRIPTION OF THE INVENTION

However, it goes without saying that the invention is in no way limited to this application and that it could of advantageously be used within the scope of any other application in which it is necessary to perform alignment adjustment of a CCD type photosensitive sensor with a crossing line of objects or persons, for example in scanners or suchlike.

Figure 1:
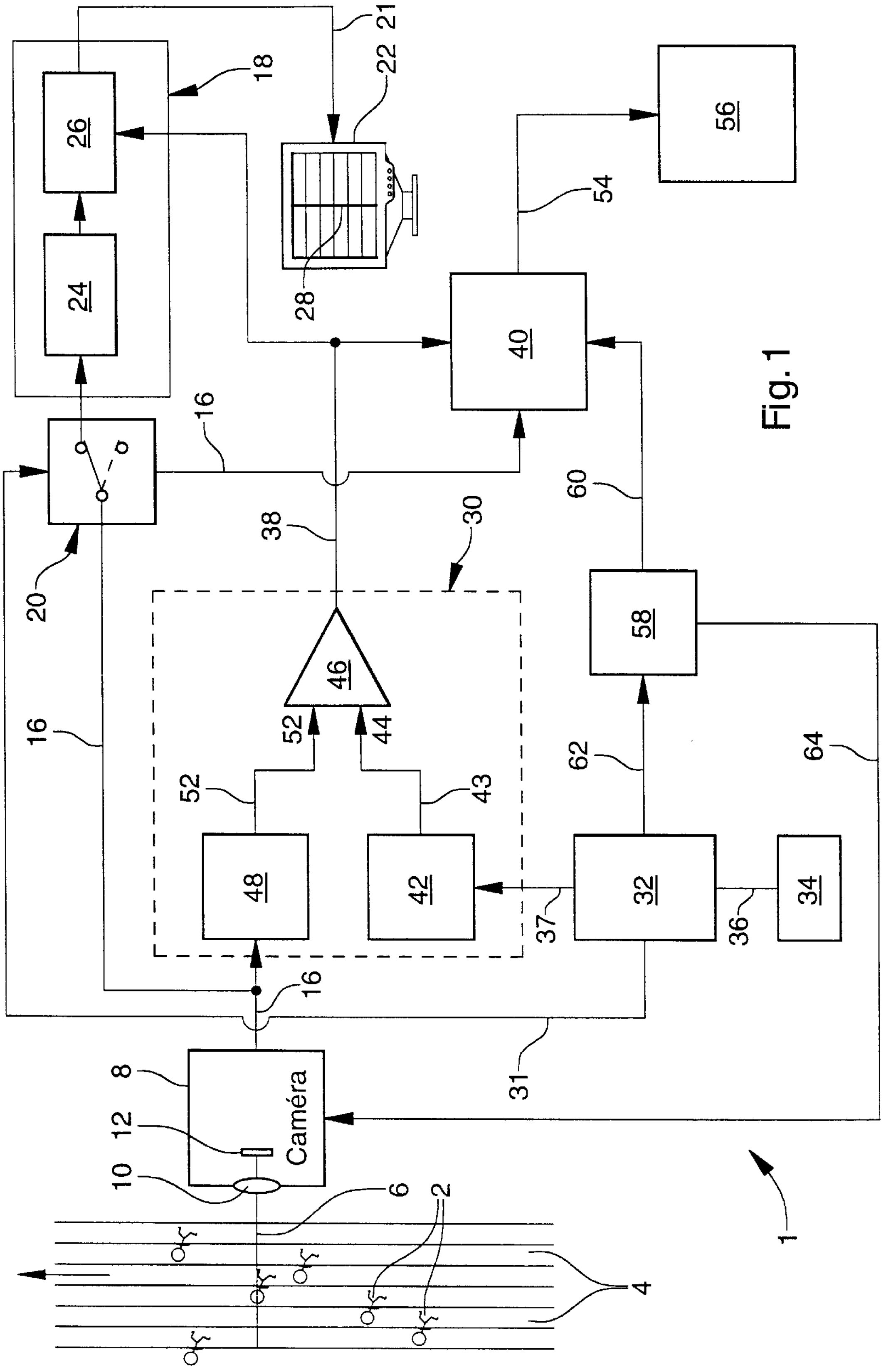
FIG. 1 shows a block diagram illustrating the principle of the system according to the invention.
Figure 2:
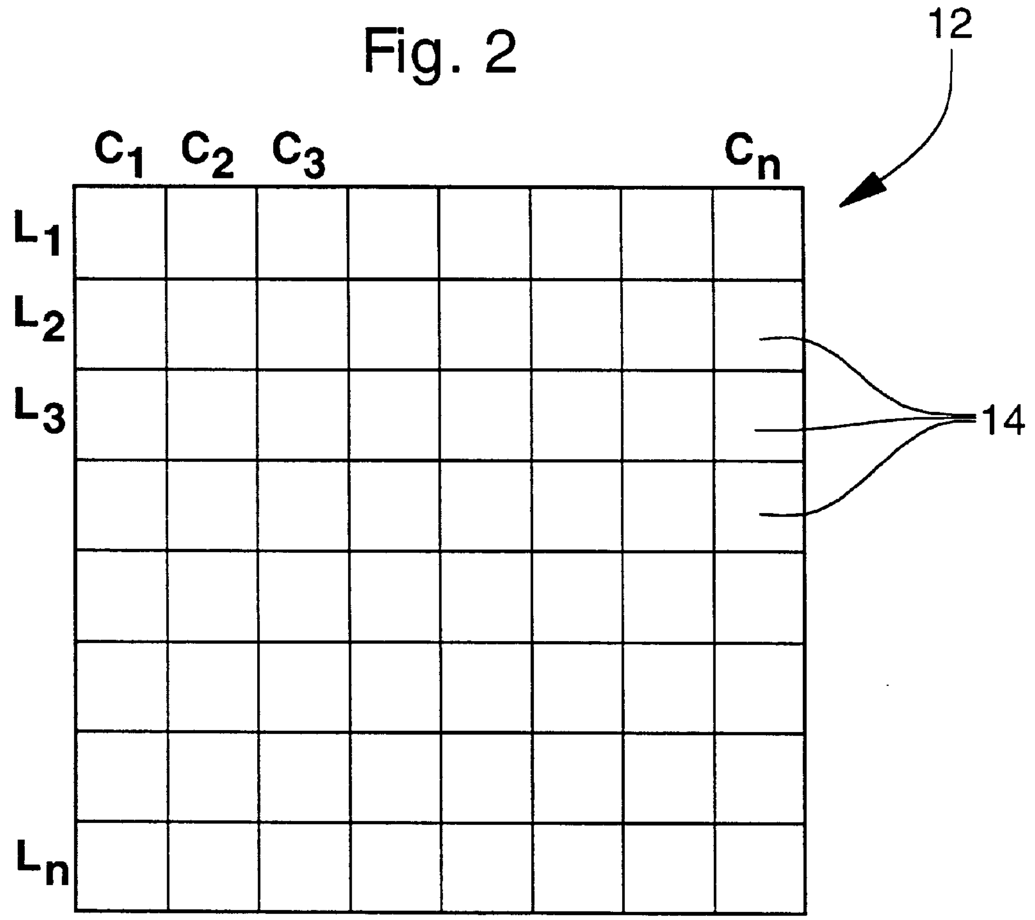
FIG. 2 shows a schematic front view of a matrix type photosensitive sensor used in the system of FIG. 1.

The block diagram of FIG. 1 shows the principle of the system according to the invention designated by the general numerical reference 1. Runners 2, each moving in a lane 4 at a certain speed, pass a crossing line 6 which can be here the finish line of the race. In the extension of this crossing line 6 is installed a camera 8 which forms part of system 1. Camera 8 includes, in the conventional manner, an optical device 10 formed of a photo or video lens which can if necessary be fitted with a manual or remote-controlled zoom. Optical device 10 projects an image of crossing line 6 onto a photosensitive sensor 12 which is situated behind the lens in a plane perpendicular to that of the Figure. According to a feature of the invention, the photosensitive sensor is a CCD type sensor which, as illustrated in FIG. 2, has the form of a matrix of pixels 14 juxtaposed in lines L1–Ln and in columns C1–Cn. Sensor 12 is capable of providing electric signals 16 representative of the image projected by optical device 10 and captured by said sensor. These signals 16 will be designated image signals in the following description. By way of example, sensor 12 includes 750 lines and 480 columns. These sensors can easily be obtained commercially, for example from Thomson.

It will also be noted that this sensor can be a color or black and white sensor according to the desired application.

Image signal 16 originating from sensor 12 is provided as input to processing means 18 via switching means 20 when these latter are in a first position shown in a continuous line in FIG. 1, this position corresponding to a first operating mode of the system called the spatial mode. These processing means 18 supply as output a processed image signal 21 to display means 22. These latter are provided for displaying an image representative of the image signal and are formed by a video standard screen or monitor such as the PAL, NTSC or multimedia standard. <<Multimedia standard>> means a digital output intended for a computer.

Processing means 18 include an encoder 24, which performs the coding of the image signal to enable it to be displayed on the monitor, and means 26 for generating a reticule 28 which is also displayed on the monitor superposed onto the video image or incrusted in a digital image. These means 28 are able to generate, on the image displayed by the monitor, a vertical line of small width, typically the width of a pixel, crossing the image which forms reticule 28 from top to bottom. Typically, the reticule can be formed by putting the portion of the image signal originating from a determined pixel column of the sensor into a given state, for example into a color. Generating means 26 are associated, via a comparator circuit 30, to control means 32 which allow in particular the horizontal movement of reticule 28 on the image to be controlled. In practice, control can be achieved by a user interface having the form of a keyboard 34 on which the user can manually input selection parameters for a column of sensor 12 which will allow formation of the reticule at a given location on monitor 22. Keyboard 34 is connected to control means 32 by a control bus 36. Control means 32 are further connected to switching means 20 in order to control, via a switching signal 31, the operating mode of the system as will be described in more detail hereinafter.

Comparator circuit 30 receives as input image signal 16 which originates from the sensor and a reference signal 37 which originates from control means 32, and provides as output a control signal 38 which is applied, on the one hand, to reticule generating means 26, and on the other hand, to extraction means 40 which will be described in more detail hereinafter.

More precisely, reference signal 37 is a signal representative of the position of the pixel column which corresponds to the desired position of the reticule on monitor 22. This signal 37 is provided to memory means 42 which form part of comparator circuit 30 and which store a digital value representative of an nth pixel column of matrix 14 forming sensor 12, this value corresponding to the pixel column parameters inputted by the user via keyboard 34. Memory means 42 are conventional and can be typically formed by a register, a ROM or a RAM . Memory or register 42 includes a default value when the system is switched on, this value can for example be that which corresponds to the central pixel column of the pixel matrix, namely the 240th column in the particular case of a matrix with 480 columns. Memory 42 provides as output a signal 43 to a first input 44 of a comparator 46.

Comparator circuit 30 further includes column counting means 48 which receive as input image signal 16 and provide as output a counting signal 50 to a second input 52 of comparator 46 which in turn provides control signal 38.

Column counting means 48 are advantageously formed by a counter-by-480 which is reset at the beginning of each frame, i.e. 50 or 60 times per second according to the video standard used (PAL or NTSC respectively).

Comparator 46 is typically a comparator which provides the control signal when counting signal 50 is equal to reference signal 37.

Extraction means 40 also receive as input image signal 16 via switching means 20 when these latter are in a second position shown in dotted lines in FIG. 1, this position corresponding to a second operating mode of the system called the temporal mode. These means 40 are provided for extracting from image signal 16 in conjunction with control signal 38 which originates from comparator circuit 30, electric signals originating from a pixel column of matrix 12, which corresponds to the position of the reticule on the screen and for providing as output a column signal 54. The column signal is then provided to exploitation means 56 which can be formed for example with the acquisition and processing circuit of the images originating from a pixel column disclosed in European Patent No. A-0 402 749. Extraction means 40 could advantageously be formed by a conventional filtering circuit which only allows the portion of image signal 16 corresponding to the reticule on the basis of control signal 38 to pass.

The system according to the invention further includes clock means 58 for reading column signal 54 at a determined frequency, or in other words the electric signals originating from the pixel column defined by the control signal 38, the pixel column forming an image representative of the image of the line projected onto this column at a given moment, the image of the line being in perfect superposition with the reticule defined hereinbefore. For this purpose, clock means 58 provide a signal which clocks the extraction, in the form of a binary signal with a frequency able to be programmed by control means 32.

The column reading frequency is selected by the operator as a function of the speed of movement of the objects or persons whose image has to be shot, in this case as a function of the speed of the race. In order to do this, the operator uses the keyboard via which he can manually input the value of this frequency, control means 32 acting as interface between the keyboard and clock means 58 and supplying to these latter a clock control signal 62. Typically, clock means 58 include a time base circuit associated with a micro-controller, these circuits being able to be obtained commercially, for example under the name Intel 80186 which combines these two components in a single integrated component.

Moreover, clock means 58 supply sensor 12 with clock sensor signals 64 for controlling the different reading or image acquisition speeds also via clock control signal 62 as a function of the system operating mode. It will be noted in this regard that the acquisition speed is slow and fixed in the spatial operating mode and rapid and variable in the temporal operating mode.

By way of example, when the system is switched into spatial operating mode, the display speed is standard i.e. PAL, NTSC or multimedia video, and when the signal is switched into temporal operating mode, the acquisition speed can be comprised between 100 and 5,000 Hz, i.e. the content of the selected column is refreshed 100 to 5,000 times per second.

In an advantageous manner, clock means 58 also control the exposure time of the image being shot.

According to a preferred embodiment, the system of the invention can further include programmable amplification means (not shown) which would be arranged between sensor 12 and switching means 20 in order to modify the contrast and luminositiy or brilliance of the image which is displayed on the monitor for each colour in the case of a colour sensor.

According to an advantageous feature of the invention, and in order to increase the resolution during extraction of the image, the pixel matrix forming sensor 12 is positioned so as to have the largest number of pixels in the columns rather than in the lines. Likewise, it is preferred to scan the matrix in the direction of the columns rather than the direction of the lines.

The adjusting method associated with the system according to the invention will now be described hereinafter.

In numerous applications of the system which has just been described, the optical axis of camera 8 has to be perfectly aligned with the line across which objects or persons which one wishes to film pass in order, for example, to determine the passing speeds or times of objects or competitors in races, as accurately as possible.

Matrix sensor 12 will also have been adjusted with respect to the case of camera 8, in particular so that the pixel column vertical of sensor 12 is identical to that of the walls of the camera case. It will be noted in this regard that the optical axis is defined by the direction perpendicular to the plane of the sensor.

Camera 8 which is equipped with a tripod or support (not shown) and able to be adjusted in accordance with all degrees of freedom, is first placed in the extension of crossing line 6 so that the optical axis of the camera is substantially directed towards this line. During this first step, the verticality of the pixel column of sensor 12 is adjusted by orienting the case of camera 8, for example using a spirit level, by acting on the adjustment knobs and/or cranks provided on the tripod.

Once this adjustment operation has been performed, the camera is switched into spatial operating mode by acting on switching means 20 via keyboard 34 and control means 32. In this operating mode, camera 8 reads, at a first determined frequency, image signal 16 originating from sensor 12 to form on monitor or screen 22 an image for example a video image. The reading frequency is generated by clock means 58 in response to the switching of the system into spatial mode via control means 32. The first frequency varies according to the video standard used and can be for example respectively 50 Hz and 60 Hz according to whether PAL or NTSC video standard is used. One could of course also use the multimedia standard.

At this moment, the video image of crossing line 6 and the environment of said line appear on monitor 22. It will be noted that focusing and framing of the video image can be effected during this operation.

A signal is then generated which allows formation of reticule 28 which is then incrusted into or superposed onto the video image displayed by the monitor. In order to form this reticule 28, the pixel columns of matrix 14 are counted, in each concerned frame of image signal 16, using counter 48. Counting signal 50 representative of one nth pixel column in the partial interlaced picture concerned frame is compared to reference signal 37 representative of the desired position of the reticule on screen 22. When equality is noted in comparator 46, control signal 38 is active. This signal 38 is then provided for the entire scanning duration of this pixel column, called reference column CR, to reticule generator 26. When this signal is active on the input of generator 26, the image signal originating from column CR is forced into a given state for example into a determined colour. Reticule 28 is thus displayed at a position on the screen, which is determined by the default value contained in reference memory 42 when switched on. According to one embodiment, the reference value is that which corresponds to the 240th pixel column of matrix 12 so that reticule 28 is formed in the middle of the screen.

The horizontal movement of reticule 28 on the screen is then controlled in order to bring the reticule into exact superposition with the video image of crossing line 6. For this purpose, the content of memory 42 is modified via keyboard 34 and control means 30.

Once this operation has been performed, column CR is selected and corresponds to reticule 28.

In particular, pixel column CR is the pixel column which will be used when the system of the invention is switched into the temporal operating mode. When the system is switched into the temporal operating mode, image signal 16 is provided as input to extraction means 40 which also receive control signal 38. In this operating mode, camera 8 reads, at a second determined frequency, image signal 16. This reading frequency is generated by clock means 58 in response to the switching of the system into temporal mode. This frequency is selected, and inputted by the user via keyboard 34 and control means 32, as a function of the speed of movement of the objects across crossing line 6. Typically this second reading frequency varies between 100 and 5,000 Hz. Extraction means 40 only allow image signal 16 to pass when control signal 38 is active to provide thus as output column signal 54 representative of the image intensity profile of crossing line 6 at a given moment. Consequently, column signal 54 originates from pixel column CR and corresponds exactly to the position of reticule 28 of the spatial operating mode.

What is claimed is:

1. A system to be installed in the extension of a line of passage of at least one object, such as a finish line of a race, said system including:

- an optical device for projecting an image of this line onto a photosensitive sensor capable of providing electric signals representative of the image projected by the optical device and picked up by said sensor, called the image signal,
- means for processing said image signal,
- display means, connected to said processing means, for displaying on a screen an image representative of said image signal, called the video image, wherein:
  - said sensor is formed of a pixel matrix containing pixel columns,
  - said system is provided with means for generating a signal forming a reticule which is displayed on said screen and which is superposed onto the video image, and
  - said system further includes means for extracting, from said image signal which is received at input, electric signals originating from a pixel column which corresponds to the position of the reticule on the screen and for providing a column signal in output.

2. A system according to claim 1, wherein said reticule is associated with control means via a comparator circuit receiving in input said image signal and a reference signal, originating from said control means, and providing in output a control signal, and wherein said reticule can be moved on said image in response to said control signal.

3. A system according to claim 2, wherein said reference signal is a signal representing the position of the pixel column which corresponds to the position of the reticule on the screen.

4. A system according to claim 2, wherein said comparator circuit includes column counting means which receive in input said image signal, memory means which receive in input and respectively providing in output said reference signal, and means for comparing the output signal from the counting means to said reference signal and providing in input said control signal.

5. A system according to claim 2, further including frame rate means for reading at a determined frequency, selected as a function of the passing speed of the object over the line, electric signals originating from said pixel column defined by said control signal, said pixel column forming an image representing a line of field of the optical device in perfect superposition with the reticule.

6. A system according to claim 5, wherein said frame rate means are connected to said sensor for controlling the different reading or image acquisition speeds and wherein they are controlled by said control means.

7. A system according to claim 1, further including means for switching said image signal either to said processing means or to said extraction means, thereby switching the system into a spatial or temporal operating mode.

8. A system according to claim 1, wherein said sensor matrix includes 480 columns and 750 lines.

9. A system according to claim 7, wherein when said image signal is switched into spatial operating mode, the display speed is PAL, NTSC, multimedia video standard and when the signal is switched into temporal operating mode, the acquisition speed can be comprised between 100 and 5,000 Hz.

10. A system according to claim 7, wherein it further includes programmable amplification means arranged between said sensor and said switching means for modifying the contrast and the lighting of the displayed image.

11. A system according to claim 1, wherein said sensor is a colour sensor.

12. A system according to claim 1, wherein said sensor is positioned so as to have more pixels in the columns than in the lines.

13. An application of a system according to claim 1, to the timing of races.

14. A method for adjusting the alignment of a system on a line of passage of objects, the system including an optical device, having an optical axis for projecting an image of said line onto a photosensitive sensor formed of a matrix of pixels for providing electric signals representing the projected image received by said sensor, called said image signal, means for processing the image signal, display means provided for displaying an image representing said image signal, called the video image, on a screen, said means being connected to the processing means, said method comprising the steps of:

(a) placing the system in the extension of said line of passage so that the axis of its optical device is substantially directed onto said line, (b) reading at a first determined frequency the electric signal provided by the pixels situated in several columns of the matrix forming the sensor to form on the screen said video image including in particular the image of said line of passage;

(c) generating a signal forming a reticule which is displayed on said screen and which is superposed onto a part of the video image;

(d) superposing said reticule onto said image of the line of passage in said video image; and (e) selecting the pixel column of the sensor which corresponds to the reticule.

15. A method according to claim 14, wherein the step (a) comprises reading the image signal at a video standard frequency of the PAL, NTSC or multimedia type.

16. A method according to claim 14, wherein the step (d) comprises moving said reticule with respect to said line of passage.

17. A method according to claim 14, wherein at step (c), said reticule is formed substantially at the centre of the image displayed by said display means.

18. A method according to claim 16, wherein said reticule is moved on said image in response to a control signal.

19. A method according to claim 14, further comprising the steps of:

(f) reading at a second determined frequency, the electric signal provided by the selected pixel column, called the column signal, which corresponds to the image intensity profile of said line at a given moment; and (g) providing said column signal to exploitation means.

20. A method according to claim 19, wherein at step (f), prior to reading of said column signal, said second determined frequency is synchronised with the speed of movement of the objects over said line of passage.

21. A method according to claim 19, wherein said second determined reading frequency can be comprised between 100 to 5,000 Hz.

* * * * *